(12) United States Patent
Sawaki

(10) Patent No.: US 8,369,013 B2
(45) Date of Patent: Feb. 5, 2013

(54) POLARIZING ELEMENT, METHOD OF MANUFACTURING POLARIZING ELEMENT, AND ELECTRONIC APPARATUS

(75) Inventor: Daisuke Sawaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/967,431

(22) Filed: Dec. 14, 2010

(65) Prior Publication Data

US 2011/0170186 A1    Jul. 14, 2011

(30) Foreign Application Priority Data

Jan. 8, 2010   (JP) ................................ 2010-002693

(51) Int. Cl.
 *G02B 5/30*   (2006.01)
 *G02B 27/28*   (2006.01)
(52) U.S. Cl. ......... 359/485.03; 359/485.05; 359/487.03; 359/487.05; 359/487.06; 359/900
(58) Field of Classification Search ............ 359/485.05, 359/487.03, 485.03, 487.05, 487.06, 900
See application file for complete search history.

(56) References Cited

U.S. PATENT DOCUMENTS

| | | | | |
|---|---|---|---|---|
| 3,291,871 A | * | 12/1966 | Francis | 264/1.31 |
| 3,293,331 A | * | 12/1966 | Doherty | 264/1.31 |
| 5,305,143 A | * | 4/1994 | Taga et al. | 359/485.01 |
| 6,714,350 B2 | * | 3/2004 | Silverstein et al. | 359/485.05 |
| 7,026,046 B2 | * | 4/2006 | Edlinger et al. | 428/310.5 |
| 7,113,335 B2 | * | 9/2006 | Sales | 359/485.03 |
| 7,233,563 B2 | | 6/2007 | Ueki et al. | |
| 2001/0053023 A1 | * | 12/2001 | Kameno et al. | 359/486 |
| 2007/0217008 A1 | * | 9/2007 | Wang et al. | 359/486 |
| 2007/0242187 A1 | * | 10/2007 | Yamaki et al. | 349/96 |
| 2008/0018997 A1 | * | 1/2008 | Kawazu et al. | 359/486 |
| 2008/0186576 A1 | | 8/2008 | Takada | |
| 2010/0103517 A1 | * | 4/2010 | Davis et al. | 359/486 |
| 2010/0134719 A1 | * | 6/2010 | Johns et al. | 349/62 |
| 2010/0225832 A1 | | 9/2010 | Kumai | |
| 2010/0225886 A1 | | 9/2010 | Kumai | |
| 2011/0102712 A1 | | 5/2011 | Kumai | |

FOREIGN PATENT DOCUMENTS

| | | |
|---|---|---|
| JP | A-2005-37900 | 2/2005 |
| JP | A-2008-216956 | 9/2008 |
| JP | A-2008-216957 | 9/2008 |
| JP | A-2010-044416 | 2/2010 |
| JP | A-2010-210705 | 9/2010 |
| JP | A-2010-210706 | 9/2010 |

* cited by examiner

*Primary Examiner* — Ricky D Shafer
(74) *Attorney, Agent, or Firm* — Oliff & Berridge, PLC

(57) ABSTRACT

A polarizing element includes: a substrate; a plurality of reflection layers that is arranged in a band shape at a predetermined interval on the substrate; dielectric layers that are formed on the reflection layers; and inorganic micro-particle layers that are formed on the dielectric layers by inorganic micro-particles having shape anisotropy in which a length of a diameter of the micro-particles in an arrangement direction of the reflection layers is longer than a length of a diameter of the micro-particles in a direction orthogonal to the arrangement direction of the reflection layers and has convex portions toward a side of a first adjacent reflection layer and a side of a second adjacent reflection layer.

9 Claims, 5 Drawing Sheets

POLARIZING ELEMENT, METHOD OF MANUFACTURING POLARIZING ELEMENT, AND ELECTRONIC APPARATUS

BACKGROUND

1. Technical Field

The present invention relates to a polarizing element, a method of manufacturing a polarizing element, and an electronic apparatus.

2. Related Art

Liquid crystal projectors as electronic apparatuses include liquid crystal devices as optical modulation devices. The liquid crystal device having a configuration in which a liquid crystal layer is pinched between one pair of substrates disposed to oppose each other is known. On one pair of the substrates described above, electrodes used for applying voltages to the liquid crystal layer are formed. In addition, on the outer sides of the substrates, an incident-side polarizing element and an outgoing-side polarizing element are disposed. Thus, predetermined polarized light is configured to be incident to and outgoing from the liquid crystal layer. Meanwhile, in order to acquire a black projection image in the above-described liquid crystal projector, almost all the light energy needs to be absorbed by the outgoing-side polarizing element. Thus, particularly, an increase in the temperature of the outgoing-side polarizing element is marked. Accordingly, for example, a technique in which two polarizing elements are disposed on the outgoing side, most of the light energy is absorbed by an outgoing pre-polarizing element disposed right after the liquid crystal device, and the contrast of a projection image is improved by an outgoing main polarizing element disposed on the latter stage is known. In order to acquire a higher heat-resistance property, the polarizing element is formed from an inorganic material. The polarizing element includes a substrate, reflection layers formed on the substrate, dielectric layers formed on the reflection layers, and inorganic micro-particle layers formed on the dielectric layers (for example, see JP-A-2008-216957).

However, when the polarizing element is used as an outgoing pre-polarizing element, depending on the form of disposition of the inorganic micro-particle layer, optical activity is given to the outgoing light. As a result, there are problems in that the intensity of leakage light leaking from the outgoing main polarizing element increases, and the contrast of the liquid crystal projector is decreased.

SUMMARY

An advantage of some aspects of the invention is to solve at least a part of the problems described above and the invention can be implemented in the following forms or application examples.

APPLICATION EXAMPLE 1

According to this application example, there is provided a polarizing element including: a substrate; a plurality of reflection layers that is arranged in a band shape at a predetermined interval on the substrate; dielectric layers that are formed on the reflection layers; and inorganic micro-particle layers that are formed on the dielectric layers by inorganic micro-particles having shape anisotropy in which a length of a diameter of the micro-particles in an arrangement direction of the reflection layers is longer than a length of a diameter of the micro-particles in a direction orthogonal to the arrangement direction of the reflection layers and has convex portions toward a side of a first adjacent reflection layer adjacent of one reflection layer and a side of a second adjacent reflection layer adjacent of the one reflection layer.

According to such a configuration, the inorganic micro-particle layer is formed from inorganic micro-particles having shape anisotropy. Accordingly, the absorbability of light can be further increased. Furthermore, the inorganic micro-particle layer has convex portions toward one adjacent reflection layer side and the other reflection layer side, that is, toward different directions (two directions). Accordingly, the intensity of leakage light can be decreased by decreasing the optical activity of the inclined incident light.

APPLICATION EXAMPLE 2

The polarizing element according to the above-described application example may be configured such that the inorganic micro-particle layer has a first inorganic micro-particle layer that has a first convex portion disposed on the side of the first adjacent reflection layer and a second inorganic micro-particle layer that has a second convex portion disposed on the side of the second adjacent reflection layer.

According to such a configuration, the optical activity of the inclined incident light is decreased by the first and second convex portions of the inorganic micro-particle layer. Accordingly, the intensity of leakage light can be decreased.

APPLICATION EXAMPLE 3

The polarizing element according to the above-described application example may be configured such that, in the cross-sectional view orthogonal to the arrangement direction of the reflection layers, the ratio between cross-sectional areas of the first inorganic micro-particle layer and the second inorganic micro-particle layer is equal.

According to such a configuration, since the ratio between the cross-sectional areas of the first inorganic micro-particle layer and the second inorganic micro-particle layer is equal, optical activity of the inclined incident light due to balanced configuration of the inorganic micro-particle layers can be efficiently decreased.

APPLICATION EXAMPLE 4

According to this application example, there is provided a method of manufacturing a polarizing element. The method includes: forming a plurality of reflection layers that is arranged in a band shape at a predetermined interval on a substrate; forming dielectric layers on the reflection layers; and forming inorganic micro-particles having shape anisotropy in which a length of a diameter of the micro-particles in the arrangement direction of the reflection layers is longer than a length of a diameter of the micro-particles in a direction orthogonal to the arrangement direction of the reflection layers on the dielectric layers and forming inorganic micro-particle layers that have convex portions toward a side of a first adjacent reflection layer adjacent of one reflection layer and a side of a second adjacent reflection layer adjacent of the one reflection layer.

According to such a configuration, since the inorganic micro-particle layer is formed from inorganic micro-particles having shape anisotropy, the absorbability of light can be further increased. In addition, the inorganic micro-particle layer has convex portions toward one adjacent reflection layer side and the other reflection layer side, that is, toward different directions (two directions). Accordingly, the intensity of leakage light can be decreased by decreasing the optical activity of the inclined incident light.

APPLICATION EXAMPLE 5

The method of manufacturing a polarizing element according to the above-described application example may be configured such that the forming of inorganic micro-particle layers includes: forming a first inorganic micro-particle layer having a first convex portion that is obliquely directed to the side of the first adjacent reflection layer by obliquely forming a film from the side of the first adjacent reflection layer; and forming a second inorganic micro-particle layer having a second convex portion obliquely directed to the side of the second adjacent reflection layer by obliquely forming a film from the side of the second adjacent reflection layer.

According to such a configuration, the optical activity of the inclined incident light is decreased due to the first convex portion and the second convex portion of the inorganic micro-particle layer, whereby the intensity of leakage light can be decreased.

APPLICATION EXAMPLE 6

According to this application example, there is provided an electronic apparatus including the above-described polarizing element or a polarizing element that is manufactured by using the above-described method.

According to such a configuration, an electronic apparatus that has superior optical characteristics can be provided. Particularly, when the polarizing element is used as an outgoing pre-polarizing element of a liquid crystal projector, the optical activity of outgoing light is decreased. Accordingly, the intensity of leakage light leaking from the outgoing main polarizing element is decreased, whereby the contrast of the liquid crystal projector can be increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
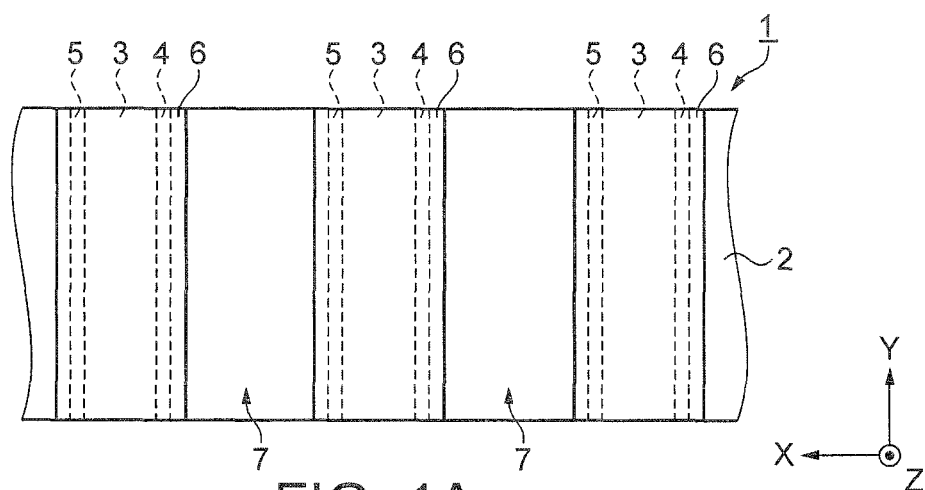
FIGS. 1A to 1C are schematic diagrams showing the configuration of a polarizing element.
Figure 1B:
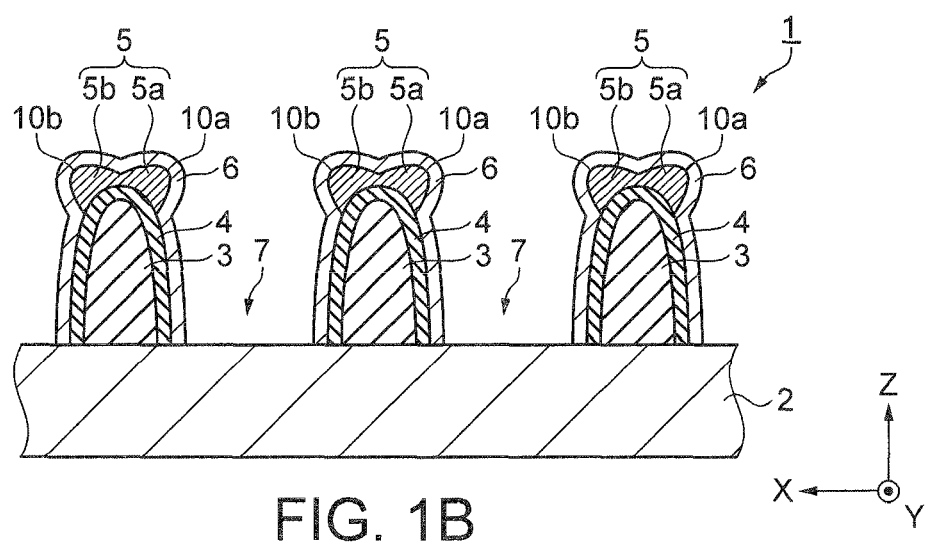
Figure 1C:
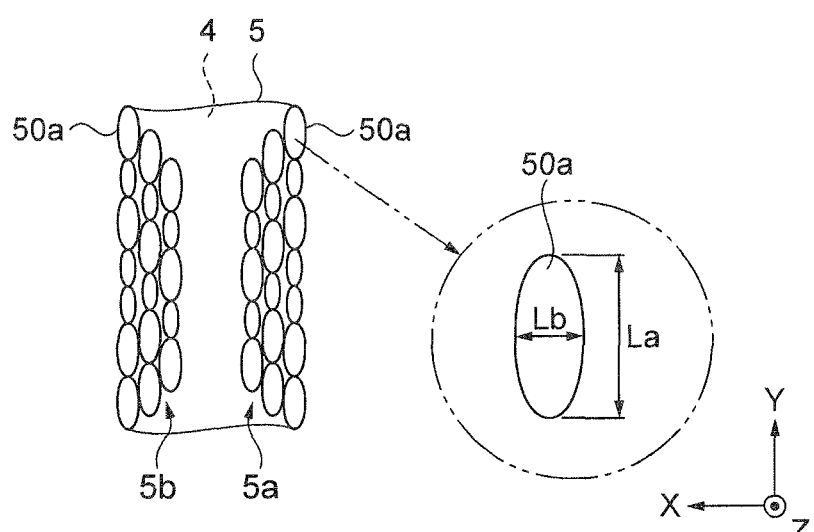

Hereinafter, embodiments of the invention will be described with reference to the drawings. In order to allow each member which is shown in the drawings to have a size which allows them to be recognized, the members are depicted using different scales.
Configuration of Polarizing Element First, the configuration of a polarizing element will be described. FIGS. 1A to 1C show the configuration of the polarizing element. FIG. 1A is a plan view, FIG. 1B is a cross-sectional view, and FIG. 1C is an enlarged partial view. As shown in FIGS. 1A to 1C, the polarizing element 1 includes: a substrate 2; a plurality of reflection layers 3 arranged in a band shape at a predetermined interval on the substrate 2; a dielectric layer 4 that is formed on the reflection layer 3; and an inorganic micro-particle layer 5 that is formed on the dielectric layer 4 by inorganic micro-particles 50a having shape anisotropy in which the length La of the diameter of micro-particles in the arrangement direction of the reflection layer 3 is longer than the length Lb of the diameter of the micro-particles in the direction orthogonal to the arrangement direction and has convex portions toward one adjacent reflection layer 3 side and the other adjacent reflection layer 3 side. In the description below, an XYZ coordinate system is set, and the positional relationship of members will be described with reference to the XYZ coordinate system. Here, a predetermined direction within a horizontal plane is set as the X axis direction, a direction orthogonal to the X axis direction within the horizontal plane is set as the Y axis direction, an a direction that is orthogonal to the X axis direction and the Y axis direction within a vertical plane is set as the Z axis direction. In this embodiment, the extension direction of the reflection layer 3 to be described later is denoted by the Y axis direction, and the axis of the arrangement of the reflection layer 3 is denoted by the X axis direction.

The substrate 2 is formed from a material that is transparent to a bandwidth of light used (in this embodiment, the visible-light range), for example, a material such as glass, quartz, sapphire, crystal, or plastic having translucency. There is a case where the polarizing element 1 stores heat so as to be at a high temperature depending on the use of the polarizing element 1. Accordingly, it is preferable to use glass, quartz, sapphire, or crystal that has high heat resistance as the material of the substrate 2.

On one face side of the substrate 2, as shown in FIG. 1A, the plurality of reflection layers 3, which extends in the Y axis direction, is formed in a stripe-like shape (band shape) in the plan view. As the material of the reflection layer 3, a light reflecting material that has a relatively high light reflectivity such as aluminum (Al) is used. In addition, other than aluminum, metal or a semiconductor material such as silver, gold, copper, molybdenum, chrome, titanium, nickel, tungsten, iron, silicon, germanium, or tellurium can be used.

The reflection layers 3 are formed at the same interval in the X axis direction with a period less than the wavelength of the visible-light range. In addition, a groove portion 7 is formed between the reflection layers 3 that are adjacent to each other. For example, the height of the reflection layer 3 is in the range of 20 nm to 200 nm, and the width of the reflection layer 3 is in the range of 20 nm to 70 nm. In addition, the interval (the width of the groove portion 7 in the X axis direction) of adjacent reflection layers 3 is in the range of 80 nm to 130 nm, and the period (pitch) thereof is 150 nm. As above, the reflection layers 3 of the polarizing element 1 have a wire grid structure. The reflection layers 3 allow linearly polarized light (a TM wave) that oscillates in a direction (the X axis direction) approximately orthogonal to the extension direction of the reflection layer 3 to be transmitted by reflecting (attenuating) linearly polarized light (a TE wave) that oscillates in a direction approximately parallel to the extension direction of the reflection layer 3 (the Y axis direction).

The dielectric layer 4 is formed from an optical material such as $SiO_2$, which is formed as a film by using a sputtering method or a sol-gel method (for example, a method in which the reflection layer coated with sol, for example, by using a spin coat method, and the sol is formed as gel through thermal curing), transparent to visible light. The dielectric layer 4 is formed as an underlying layer of the inorganic micro-particle layer 5. In addition, the dielectric layer 4 is formed so as to increase the interference effect by adjusting the phase of polarized light that is transmitted through the inorganic micro-particle layer 5 and is reflected by the reflection layer 3 with respect to the polarized light reflected by the inorganic micro-particle layer 5.

As the material composing the dielectric layer 4, a general material other than $SiO_2$ such as $Al_2O_3$ or $MgF_2$ can be used. These materials can be formed as a thin film by using a general vacuum film forming method such as a sputtering method, a vapor-phase epitaxial method, or a vapor deposition method or by coating the upper side of the substrate 2 with a sol-state material and thermally curing the substrate 2. It is preferable that the refractive index of the dielectric layer 4 is higher than 1 and equal to or lower than 2.5. Since the optical characteristics of the inorganic micro-particle layer 4 are influenced by the refractive index of the surroundings thereof, the characteristics of the polarizing element can be controlled by using the material of the dielectric layer.

The inorganic micro-particle layer 5 is formed on the dielectric layer 4. In this embodiment, as shown in FIG. 1B, the inorganic micro-particle layer 5 is formed on the top of the dielectric layer 4.

The inorganic micro-particle layer 5 is formed by inorganic micro-particles 50a. The inorganic micro-particle 50a, as shown in FIG. 1C has shape anisotropy in which the length La of the diameter of the micro-particle in the arrangement direction (the Y axis direction) of the reflection layer 3 is longer than the length Lb of the diameter of the micro-particle in a direction (the X axis direction) orthogonal to the arrangement direction (the Y axis direction) of the reflection layer 3. As above, since the inorganic micro-particle has shape anisotropy, the optical constants in the Y-axis direction (the long-axis direction) and the X-axis direction (the short-axis direction) can be set to be different from each other. As a result, specific polarization characteristics of absorbing a polarized component that is parallel to the long-axis direction and transmitting a polarized component that is parallel to the short axis direction can be acquired. The inorganic micro-particle layer 5 that is composed of the inorganic micro-particles 50a having shape anisotropy as above can be formed by orthorhombic film forming such as oblique sputtering film forming.

As the material of the inorganic micro-particle 50a, an appropriate material is selected in accordance with the bandwidth used as the polarizing element 1. In other words, a metal material or a semiconductor material satisfies such a condition. More specifically, as examples of the metal material, there are simple substances of Al, Ag, Cu, Au, Mo, Cr, Ti, W, Ni, Fe, Si, Ge, Te, and Sn or alloys thereof. In addition, as examples of the semiconductor material, there are Si, Ge, and Te. Furthermore, a silicide-based material such as $FeSi_2$ (particularly, $\beta$-$FeSi_2$), $MgSi_2$, $NiSi_2$, $BaSi_2$, $CrSi_2$, or $CoSi_2$ is appropriately used. In particular, by using an aluminum-based metal micro-particle formed from aluminum or an alloy of aluminum or a semiconductor micro-particle containing beta iron silicide, germanium, or tellurium as the material of the inorganic micro-particle 50a, high contrast (a high extinction ratio) can be acquired for the visible-light range. In addition, in order to implement a polarization property for a wavelength bandwidth other than that of visible light, for example, an infrared range, it is appropriate to use micro-particles of Ag (silver), Cu (copper), or Au (Gold) as the inorganic micro-particles composing the inorganic micro-particle layer. The reason for this is that the resonance wavelength of the above-described metal in the long axis direction is near the infrared range. In addition, other than the above-described materials, a material such as molybdenum, chrome, titanium, tungsten, nickel, iron, or silicon can be used in accordance with the bandwidth used.

In the inorganic micro-particle layer 5, in the cross-sectional view (the cross-sectional view in the X axis direction) orthogonal to the arrangement direction (the Y-axis direction) of the reflection layer 3, convex portions are formed toward one adjacent reflection layer side and the other adjacent reflection layer 3 side. In this embodiment, the inorganic micro-particle layer 5 includes the first inorganic micro-particle layer 5a having the first convex portion 10a that is disposed on one adjacent reflection layer 3 side and the second inorganic micro-particle layer 5b having the second convex portion 10b that is disposed on the other adjacent reflection layer 3 side. In other words, as shown in FIG. 1B, in the arrangement direction (the Y-axis direction) in which one reflection layer 3 is formed, the first inorganic micro-particle layer 5a and the second inorganic micro-particle layer 5b are formed on the positive side of the X axis and the negative side of the X axis. In addition, in this embodiment, in the cross-sectional view orthogonal to the arrangement direction of the reflection layer 3, when a center line that divides the reflection layer 3 into two in the vertical direction with respect to the substrate 2 is drawn, the ratio between the cross-sectional areas of the first and second inorganic micro-particle layers 5a and 5b is formed to be almost equal.

On the inorganic micro-particle layer 5, a protection layer 6 is formed. As the material of the protection layer 6, a general material such as $SiO_2$, $Al_2O_3$, or $MgF_2$ can be used. These materials can be formed as a thin film by using a general vacuum film forming method such as a sputtering method, a vapor-phase epitaxial method, or a vapor deposition method or by coating the upper side of the substrate 2 with a sol-state material and thermally curing the substrate 2.

Thus, the polarizing element 1 according to this embodiment includes: the substrate 2 that is transparent to visible light; the reflection layers 3, in which band-shaped thin films extending in one direction on the substrate 2 are disposed at a predetermined interval, that is formed from metal; the dielectric layer 4 that is formed on the reflection layer 3; and the inorganic micro-particle layer 5 in which the inorganic micro-particles 50a are arranged in a linear shape. In addition, the inorganic micro-particle layer 5 is formed so as to be arranged on the dielectric layer 4 in a position corresponding to the band-shaped thin film. Furthermore, a wire grid structure is formed having a longitudinal direction that is the same as the direction in which the inorganic micro-particles 50a are arranged in a linear shape, and the inorganic micro-particle 50a has shape anisotropy in which the diameter in the arrangement direction of the inorganic micro-particle 50a is long and the diameter in the direction orthogonal to the arrangement direction is short. In addition, the inorganic micro-particle layer 5 has the convex portions 10a and 10b toward one adjacent reflection layer 3 side and the other adjacent reflection layer 3 side.

Figure 2A:
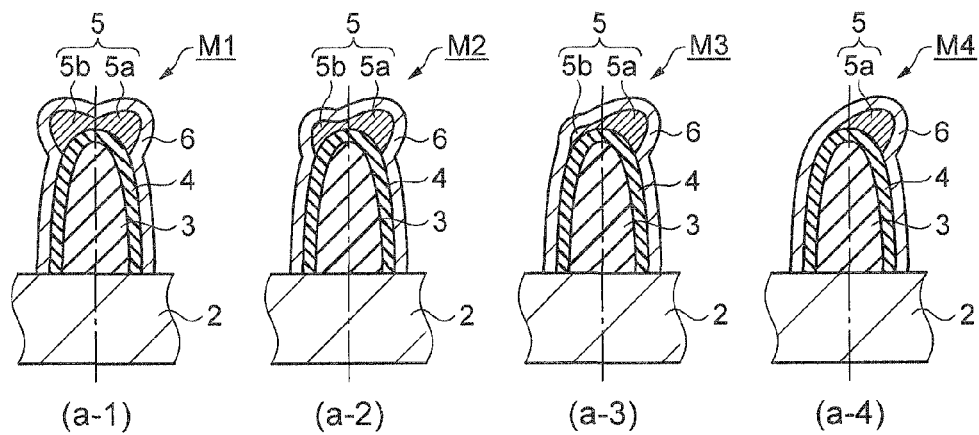
FIGS. 2A and 2B are explanatory diagrams showing the forms of a polarizing element and the characteristics of the intensity of leakage light.
Figure 2B:
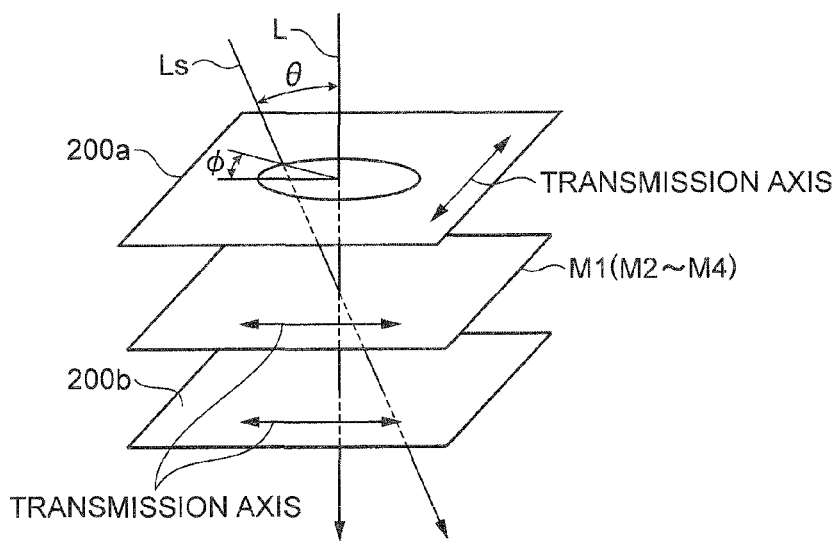

Here, the relationship between the forms of the first and second inorganic micro-particle layers 5a and 5b and the intensity of leakage light leaking from an outgoing main polarizing element in a case where the polarizing element 1 is used as an outgoing pre-polarizing element will be described. FIGS. 2A and 2B are explanatory diagrams showing the form of the polarizing element and the characteristics of the intensity of leakage light.

FIG. 2A shows models of the polarizing element so as to acquire the characteristics of the intensity of leakage light through simulation. In this simulation, four models including the first to fourth models M1 to M4 shown in parts (a-1) to (a-4) of FIG. 2A are used. The ratio between the cross-sectional areas of the first inorganic micro-particle layer 5a and the second inorganic micro-particle layer 5b is changed for the first to fourth models. In addition, in this simulation, the width of the reflection layer 3 is configured as 45 nm, the height of the reflection layer 3 is configured as 60 nm, and the thickness of the dielectric layer 4 is configured as 10 nm. The period is configured as 150 nm. In addition, the materials of the substrate 2, the reflection layer 3, the dielectric layer 4, and the inorganic micro-particle layer 5 are configured as $SiO_2$, aluminum, $SiO_2$, and amorphous silicon.

Hereinafter, the characteristic parts of the first to fourth models M1 to M4 will be described. First, in the first model M1, as shown in the part (a-1) of FIG. 2A, the ratio between the cross-sectional areas of the second inorganic micro-particle layer 5b and the first inorganic micro-particle layer 5a, in the cross-sectional view in the direction orthogonal to the arrangement direction of the reflection layer 3, is configured to be 5:5 with respect to a virtual center line. In other words, in the first model M1, the ratio between the cross-sectional areas of the first inorganic micro-particle layer 5a and the second inorganic micro-particle layer 5b are equal. Similarly, in the second model M2, as shown in the part (a-2) of FIG. 2A, the ratio between cross-sectional areas of the second inorganic micro-particle layer 5b and the first inorganic micro-particle layer 5a is 3:7. In the third model M3, as shown in the part (a-3) of FIG. 2A, the ratio between the cross-sectional areas of the second inorganic micro-particle layer 5b and the first inorganic micro-particle layer 5a is 1:9. In addition, in the fourth model M4, as shown in the part (a-4) of FIG. 2A, the ratio between the cross-sectional areas of the second inorganic micro-particle layer 5b and the first inorganic micro-particle layer 5a is 0:10. In other words, in the fourth model M4, a state is formed in which there is no second inorganic micro-particle layer 5b.

FIG. 2B shows the disposition of simulation models of polarizing elements that include the first to fourth models M1 to M4. As shown in FIG. 2B, an incident-side polarizing element 200a is disposed on the incident side of light so as to be orthogonal to the optical axis L of the incident light, and an outgoing main polarizing element 200b is disposed on the outgoing side of the light so as to be orthogonal to the optical axis L of the incident light. The incident-side polarizing element 200a and the outgoing main polarizing element 200b are assumed to be ideal absorption-type polarizing elements and are maintained to be in a crossed-Nicol state. Between the incident-side polarizing element 200a and the outgoing main polarizing element 200b, the first to fourth models M1 to M4 are disposed as the outgoing pre-polarizing elements. Here, the first to fourth models M1 to M4 maintain to be in a parallel Nicole state with the outgoing main polarizing element 200b. In this simulation, in consideration of illumination light of a liquid crystal projector, the inclined incident light is defined to have a tilt angle θ and a rotation angle φ with respect to the optical axis L. In addition, in an actual liquid crystal projector, although a liquid crystal device is disposed between the incident-side polarizing element 200a and the first to fourth models M1 to M4 as the outgoing pre-polarizing elements, in order to clarify only the characteristics of the first to fourth models M1 to M4 as the outgoing pre-polarizing elements, a liquid crystal device is omitted in this simulation.

Figure 3C:
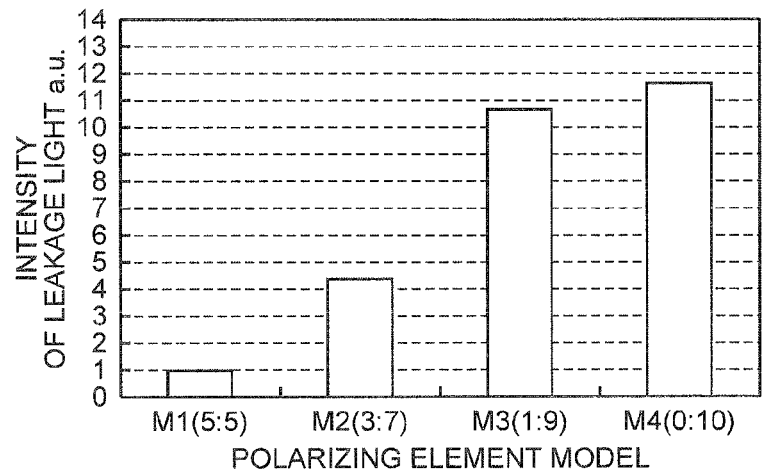
FIGS. 3C and 3D are explanatory diagrams showing the forms and characteristics of the intensity of leakage light of a polarizing element.
Figure 3D:
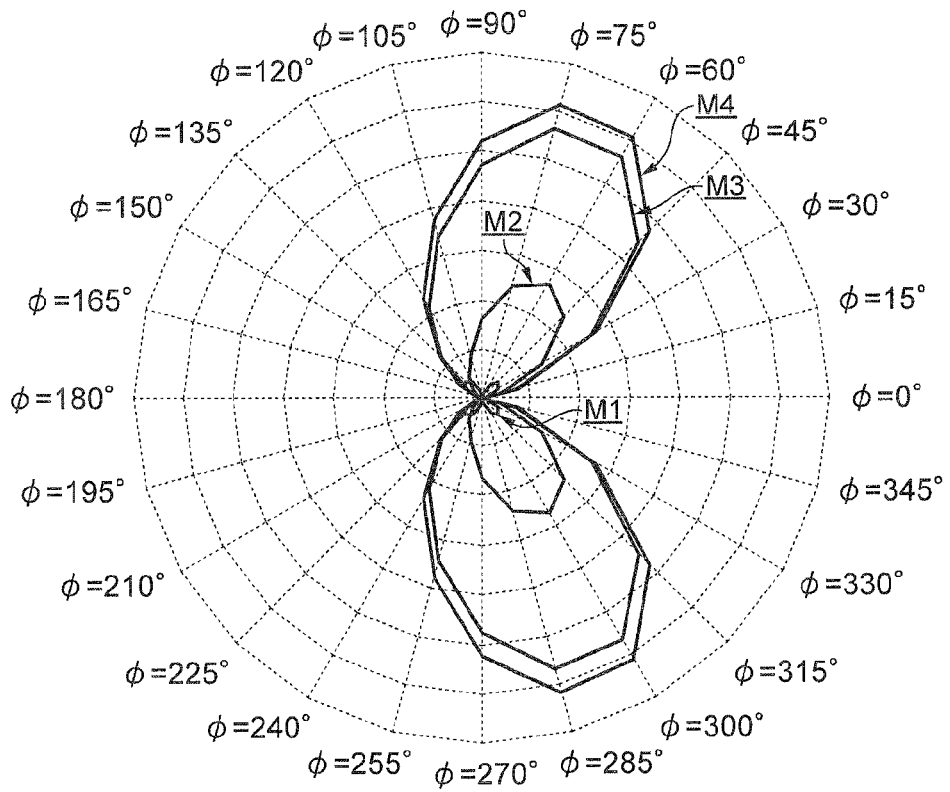

FIG. 3C shows relative values of the intensities of leakage light leaking from the outgoing main polarizing elements 200b in the first to fourth models M1 to M4. In this calculation, θ=5° and φ is changed in the range of 0° to 345° by 15° each time, and a sum thereof is acquired. According to this simulation, the second model M2 (the ratio of the cross-sectional areas of 3:7) has an intensity of leakage light that is about 4.3 times that of the first model M1 (the second inorganic micro-particle layer 5b: the first inorganic micro-particle layer 5a=the ratio of cross-sectional areas of 5:5), the third model M3 (the ratio of the cross-sectional areas of 1:9) has an intensity of leakage light that is about 10.7 times that of the first model M1, and the fourth model M4 (the ratio of the cross-sectional areas of 0:10) has an intensity of leakage light that is about 11.8 times that of the first model M1. In other words, according to this embodiment, it can be understood that there is an effect of decreasing the intensity of leakage light in a case where at least a tiny second inorganic micro-particle layer 5b is formed, and a case where the ratio between the cross-sectional areas of the first inorganic micro-particle layer 5a and the second inorganic micro-particle layer 5b is equal (5:5, horizontally symmetric) is appropriate for decreasing the intensity of leakage light. FIG. 3D shows the intensities of outgoing light outgoing from the outgoing main polarizing element 200b at the rotation angle with respect to the optical axis L for the models M1 to M4. In the figure, φ=0° or 180° is within the X-Z plane in the coordinate system shown in FIGS. 1A to 1C. Here, φ=0° corresponds to incident light that is incident from the second inorganic micro-particle layer 5b side, and φ=180° corresponds to incident light that is incident from the first inorganic micro-particle layer 5a side. As shown in FIG. 3D, it can be understood that the intensity distributions in the first to fourth quadrants are almost the same in the first model M1. This intensity distribution is the same as that of the state in which ideal absorption-type polarizing elements are disposed in the crossed-Nicol, and it can be understood that optical activity does not occur in the first model M1. On the other hand, for the second models M2 to the fourth models M4, it can be understood that the symmetry between the first quadrant and the second quadrant and between the third quadrant and the fourth quadrant collapses so as to further increase the intensity of leakage light. The reason for this, as can be understood from FIG. 2A, is thought to be the inclination of the optical axis from the Z-axis direction within the cross-section so as to increase the optical activity of the inclined incident light due to collapse of the horizontal symmetry in the structure.

In addition, other than the simulation of the inclined incident light with θ=5°, simulation is performed in a similar manner for inclined incident light with θ=10° and θ=20°. Based on the simulation, as above, by forming the second inorganic micro-particle layer 5b in addition to the first inorganic micro-particle layer 5a, the effect of decreasing the intensity of leakage light is acquired. In addition, in a case where the ratio between the cross-sectional areas of the first inorganic micro-particle layer 5a and the second inorganic micro-particle layer 5b is equal (the ratio thereof is 5:5), the intensity of the leakage light decreases the most.

In the polarizing element 1 of this embodiment configured as above, the surface side of the substrate 2, that is, the face side of the substrate 2 on which the lattice-shaped reflection layer 3, the dielectric layer 4, and the inorganic micro-particle layer 5 are formed becomes a light incident face. The polarizing element 1 attenuates a polarized wave (TE wave (S wave)) having an electric field component (in the lattice axis direction, the Y axis direction) that is parallel to the arrangement direction of the reflection layer 3 and transmits a polarized wave (TM wave (P wave)) having an electric field component (in the direction orthogonal to the lattice, the X-axis direction) vertical to the arrangement direction of the reflection layer 3 by using the four actions of transmission, reflection, and interference of light and selective light absorption of a polarized wave owing to the optical anisotropy. In other words, the TE wave is attenuated by the light absorbing action of the inorganic micro-particle layer 5. The reflection layer 3 serves as a wire grid and reflects the TE wave transmitted through the inorganic micro-particle layer 5 and the dielectric layer 4. Here, the TE wave reflected by the reflection layer 3 interferes with the TE wave reflected by the inorganic micro-particle layer 5 so as to be attenuated. The TE wave can be selectively attenuated as described above.

Method of Manufacturing Polarizing Element

Next, a method of manufacturing a polarizing element will be described. FIGS. 4A to 4E are flow diagrams showing the method of manufacturing a polarizing element. The method of manufacturing a polarizing element according to this embodiment includes: a reflection layer forming process in which a plurality of reflection layers arranged in a band shape at a predetermined interval is formed on a substrate; a dielectric layer forming process in which a dielectric layer is formed on the reflection layer; and an inorganic micro-particle layer forming process in which inorganic micro-particles having shape anisotropy, in which the length of the diameter of the micro-particles in the arrangement direction of the reflection layer is longer than the length of the diameter of the micro-particles in the direction orthogonal to the arrangement direction of the reflection layer, are formed on the dielectric layer, and an inorganic micro-particle layer having convex portions directed toward one adjacent reflection layer side and the other adjacent reflection layer side is formed. The inorganic micro-particle layer forming process includes: a first inorganic micro-particle layer forming process in which the first inorganic micro-particle layer having the first convex portion that is obliquely directed to one reflection layer side by obliquely forming a film from the side of one reflection layer out of adjacent reflection layers is formed; and a second inorganic micro-particle layer forming process in which the second inorganic micro-particle layer having the second convex portion that is obliquely directed to the other reflection layer side by obliquely forming a film from the side of the other reflection layer out of the adjacent reflection layers. Hereinafter, the description will be presented with reference to the drawings.

Figure 4A:
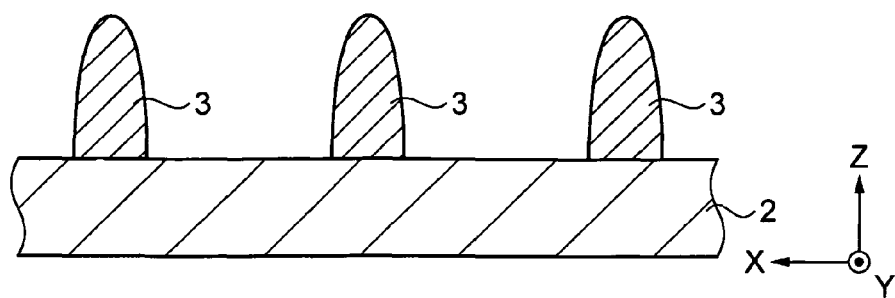
FIGS. 4A to 4E are process drawings showing a method of manufacturing a polarizing element.

In the reflection layer forming process shown in FIG. 4A, the reflection layers 3 are formed on the substrate 2. For example, the reflection layers 3 are formed by pattern processing of a metal film, which is formed from aluminum or the like, using a photolithographic method.

Figure 4B:
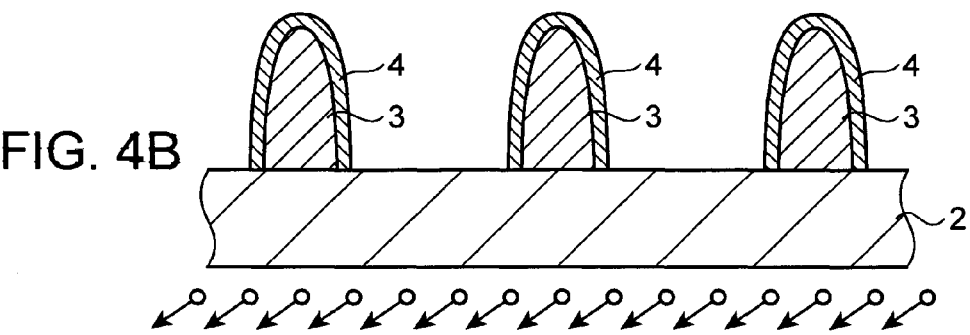

In the dielectric layer forming process shown in FIG. 4B, the dielectric layers 4 are formed on the reflection layers 3. For example, the dielectric layers formed from $SiO_2$ or the like are formed by using a sputtering method or a sol-gel method.

Figure 4C:
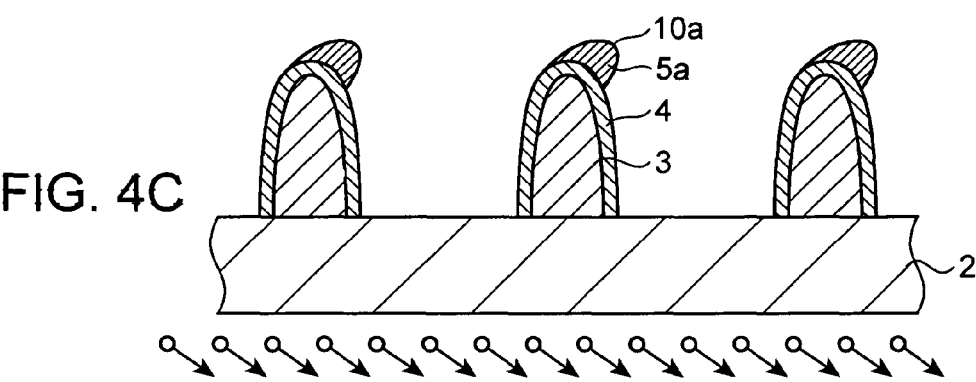

In the first inorganic micro-particle layer forming process shown in FIG. 4C, the first inorganic micro-particle layer 5a having the first convex portion 10a that is obliquely directed on the side of one reflection layer 3 out of adjacent reflection layers 3 by obliquely forming a film from the side of one reflection layer 3. More specifically, for example, the first inorganic micro-particle layer 5a is formed by depositing sputtered particles from a direction inclined with respect to the substrate 2 on which the reflection layer is formed. In FIG. 4C, the incident direction of the sputtered particles is denoted by arrows. The oblique angle of the oblique film formation with respect to the substrate 2 face can be appropriately set in the range of about 0° to 50°.

Figure 4D:
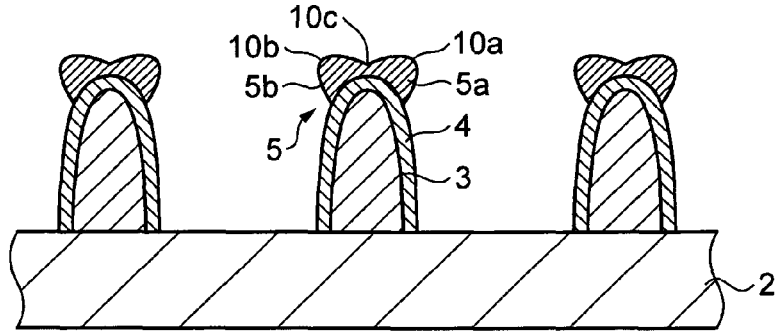

In the second inorganic micro-particle layer forming process shown in FIG. 4D, the second inorganic micro-particle layer 5b having the second convex portion 10b that is obliquely directed to the other reflection layer 3 side is formed by obliquely forming a film from the side of the other reflection layer 3 out of adjacent reflection layers 3. In other words, the film is formed from the oblique direction that is a direction opposite to the oblique direction of oblique film formation in the above-described first inorganic micro-particle layer forming process. More specifically, for example, the second inorganic micro-particle layer 5b is formed by depositing the sputtered particles from the direction inclined with respect to the substrate 2 on which the reflection layers 3 are formed using a sputtering device. In FIG. 4D, the incident direction of the sputtered particles is denoted by arrows. The oblique angle of the oblique film formation with respect to the substrate 2 face can be appropriately set in the range of about 0° to 50°. Further, as shown in FIG. 4D, the first convex portion 10a and the second convex portion 10b are separated by at least one concave portion 10c in the inorganic micro-particle layer 5.

In addition, in the first and second inorganic micro-particle layer forming processes, the inorganic micro-particles 50a that have shape anisotropy in which the length La of the diameter of the micro-particles in the arrangement direction of the reflection layer 3 is longer than the length Lb of the diameter of the micro-particles in the direction orthogonal to the arrangement direction of the reflection layer 3 are formed on the dielectric layer 4 through the oblique film formation (see FIG. 1C).

Alternatively, the first inorganic micro-particle layer forming process may be performed after the second inorganic micro-particle layer forming process, or the first and second inorganic micro-particle layer forming processes may be simultaneously performed.

Here, in the oblique film formation performed in the above-described first and second inorganic micro-particle layer forming processes, the amounts of sputtered particles to be deposited on the side close to the target of the sputtering device and on the side far from the target are different from each other. Thus, the amount of sputtered particles that are deposited tends to increase as it nears the target. Accordingly, in the first inorganic micro-particle layer forming process shown in FIG. 4C, the volume of the first inorganic micro-particle layer 5a increases as it is on a side closer (the negative side in the X axis direction) to the target of the sputtering device. In contrast, the volume of the first inorganic micro-particle layer 5a decreases as it is on a side farther (the positive side in the X axis direction) from the target. On the other hand, in the second inorganic micro-particle layer forming process shown in FIG. 4D, the volume of the second inorganic micro-particle layer 5b increases as it is on a side closer (the positive side in the X axis direction) to the target of the sputtering device. In contrast, the volume of the second inorganic micro-particle layer 5b decreases as it is on a side farther (the negative side in the X axis direction) from the target. Thus, although the volumes of each of the first inorganic micro-particle layers 5a and each of the second inorganic micro-particle layers 5b are different, the sums of the volumes of the first and second inorganic micro-particle layers 5a and 5b corresponding to the reflection layers 3 are the same. Accordingly, the inorganic micro-particle layers 5 having the same total volume are formed on the reflection layers 3. Therefore, balanced optical characteristics can be acquired.

Figure 4E:
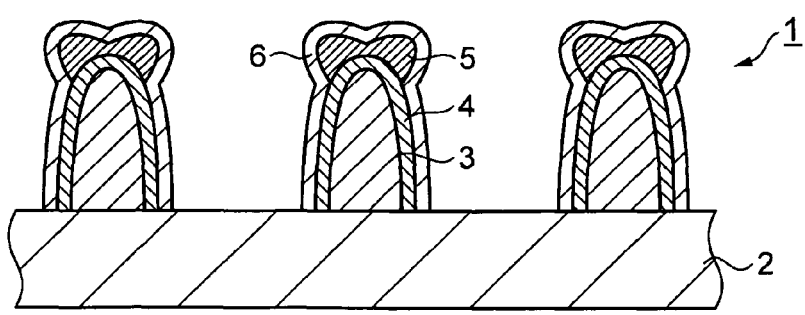

In the protection layer forming process shown in FIG. 4E, the protection layers 6 are formed on the first and second inorganic micro-particle layers 5a and 5b. The protection layer 6, for example, is formed with $SiO_2$ by using a sputtering method or the like. Through the above-described processes, a polarizing element 1 can be manufactured.

Configuration of Electronic Apparatus

Figure 5:
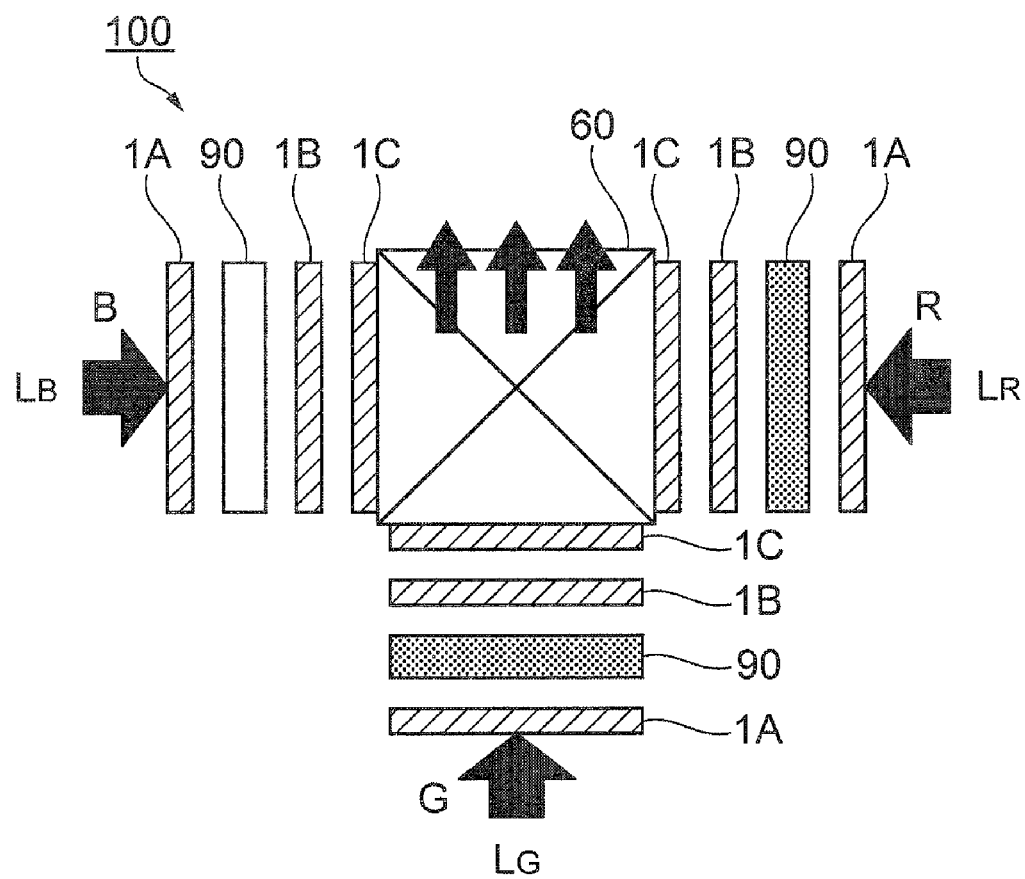
FIG. 5 is a schematic diagram showing the configuration of a liquid crystal projector as an electronic apparatus.

Next, the configuration of an electronic apparatus will be described. FIG. 5 is a schematic diagram showing the configuration of a liquid crystal projector as the electronic apparatus. The liquid crystal projector 100 includes a lamp that is a light source, a liquid crystal panel, a polarizing element 1, and the like.

As shown in FIG. 5, the optical engine part of the liquid crystal projector 100 includes: an incident-side polarizing element 1A, a liquid crystal panel 90, an outgoing pre-polarizing element 1B, and an outgoing main polarizing element 1C for red light LR; an incident-side polarizing element 1A, a liquid crystal panel 90, an outgoing pre-polarizing element 1B, and an outgoing main polarizing element 1C for green light LG; an incident-side polarizing element 1A, a liquid crystal panel 90, an outgoing pre-polarizing element 1B, and an outgoing main polarizing element 1C for blue light LB; and a cross dichroic prism 60 that composes light output from the outgoing main polarizing elements 1C and allows the composed light to be outgoing to a projection lens (not shown). Here, the polarizing element 1 can be applied to each of the incident-side polarizing elements 1A, the outgoing pre-polarizing elements 1B, and the outgoing main polarizing elements 1C. In particular, by applying the polarizing element 1 to the outgoing pre-polarizing element 1B, the contrast can be improved by decreasing the intensity of leakage light leaking from the outgoing main polarizing element 1C.

The liquid crystal projector 100 has a configuration in which light outgoing from a light source lamp (not shown) is separated into red light LR, green light LG, and blue light LB by a dichroic mirror (not shown), the separated light is incident to the corresponding incident-side polarizing element 1A, then, the light LR, LG, and LB polarized by the incident-side polarizing elements 1A is spatially modulated by the liquid crystal panel 90 so as to be output and passes through the outgoing pre-polarizing element 1B and the outgoing main polarizing element 1C, and then, the light is composed by the cross dichroic prism 60 and is projected from the projection lens. Even when the light source lamp has a high output level, the polarizing element 1 has superior light-resistance characteristics for strong light. Accordingly, a liquid crystal projector having high reliability can be provided.

In addition, the electronic apparatus including the polarizing element 1 is not limited to a liquid crystal projector 100. Other examples include the polarizing element 1 can be applied to a car navigation device for vehicles, the liquid crystal display of an instrument panel or the like.

Therefore, according to the above-described embodiment, the following advantages are acquired.

The polarizing element 1 has the inorganic micro-particle layer 5 including the first inorganic micro-particle layer 5a that is obliquely directed to one adjacent reflection layer 3 side and has the first convex portion 10a and the second inorganic micro-particle layer 5b that is obliquely directed to the other adjacent reflection layer 3 side and has the second convex portion 10b. Accordingly, the optical activity for the inclined incident light decreases, and the amount of leakage light can be decreased. In addition, by forming the ratio between the cross-sectional areas of the first inorganic micro-particle layer 5a and the second inorganic micro-particle layer 5b so as to be equal, the intensity of leakage light can be further decreased. By applying the above-described polarizing element 1 to a liquid crystal projector 100, a liquid crystal projector 100 that has superior optical characteristics and high contrast can be provided.

The invention is not limited to the above-described embodiment. Thus, the following modified examples may be applied.

MODIFIED EXAMPLE 1

In the above described embodiment, the ratio between the cross-sectional areas of the first inorganic micro-particle layer 5a and the second inorganic micro-particle layer 5b is formed to be equal (the ratio thereof is 5:5). However, the invention is not limited thereto. For example, the ratio of the cross-sectional area of the first inorganic micro-particle layer 5a to the cross-sectional area of the second inorganic micro-particle layer 5b (the cross-sectional area of the firstinorganic micro-particle layer 5a: the cross-sectional area of the second inorganic micro-particle layer 5b) may be configured to be 1:9 or 9:1. In other words, the first inorganic micro-particle layer 5a and the second inorganic micro-particle layer 5b may be formed toward different directions. Even in such a case, the intensity of the leakage light can be decreased by decreasing the optical activity.

MODIFIED EXAMPLE 2

In the above-described embodiment, the cross-sectional area of the first inorganic micro-particle layer 5a is fixed at a predetermined value, and the cross-sectional area of the second inorganic micro-particle layer 5b is changed. However, it may be configured that the cross-sectional area of the second inorganic micro-particle layer 5b is fixed at a predetermined value, and the cross-sectional area of the first inorganic micro-particle layer 5a is changed. In other words, the first inorganic micro-particle layer 5a and the second inorganic micro-particle layer 5b may be interchanged. Even in such a case, the same advantages can be acquired.

The entire disclosure of Japanese Application No. 2010-002693, filed Jan. 8, 2010 is expressly incorporated by reference herein.

What is claimed is:

1. A polarizing element comprising:
   a substrate;
   a plurality of reflection layers that are arranged in a band shape at a predetermined interval on the substrate;
   dielectric layers that are formed on the plurality of reflection layers; and
   inorganic micro-particle layers that are formed on the dielectric layers by inorganic micro-particles having shape anisotropy in which a length of a diameter of the inorganic micro-particles in a band shape arrangement direction of the plurality of reflection layers is longer than a length of a diameter of the inorganic micro-particles in a direction orthogonal to the band shape arrangement direction of the plurality of reflection layers, wherein at least one of the inorganic micro-particle layers, when viewed in a cross-sectional view orthogonal to the band shape arrangement direction of the plurality of reflection layers, has a first convex portion toward a side of a first adjacent reflection layer adjacent to one reflection layer and a second convex portion toward a side of a second adjacent reflection layer adjacent to the one reflection layer,
   wherein the first convex portion and the second convex portion are separated by at least one concave portion in the inorganic micro-particle layers.

2. The polarizing element according to claim 1,
   wherein the inorganic micro-particle layers include a first inorganic micro-particle layer that has the first convex portion disposed on the side of the first adjacent reflection layer and a second inorganic micro-particle layer that has the second convex portion disposed on the side of the second adjacent reflection layer.

3. The polarizing element according to claim 2, wherein, in the cross-sectional view orthogonal to the band shape arrangement direction of the plurality of reflection layers, the ratio between cross-sectional areas of the first inorganic micro-particle layer and the second inorganic micro-particle layer is equal.

4. An electronic apparatus comprising the polarizing element according to claim 1.

5. The polarizing element according to claim 1, further comprising:
 a protection layer formed directly on at least the first convex portion and the second convex portion that are separated by the at least one concave portion in the inorganic micro-particle layers; and
 a groove portion formed between adjacent absorption layers.

6. A method of manufacturing a polarizing element, the method comprising:
 forming a plurality of reflection layers that are arranged in a band shape at a predetermined interval on a substrate;
 forming dielectric layers on the plurality of reflection layers;
 forming inorganic micro-particles having shape anisotropy in which a length of a diameter of the inorganic micro-particles in the band shape arrangement direction of the plurality of reflection layers is longer than a length of a diameter of the inorganic micro-particles in a direction orthogonal to the arrangement direction of the plurality of reflection layers on the dielectric layers; and
 causing at least one of the inorganic micro-particles to have a first convex portion toward a side of a first adjacent reflection layer adjacent to one reflection layer and a second convex portion toward a side of a second adjacent reflection layer adjacent to the one reflection layer, when viewed in a cross-sectional view orthogonal to the band shape arrangement direction of the plurality of reflection layers,
 wherein the first convex portion and the second convex portion are separated by at least one concave portion in the inorganic micro-particle layers.

7. The method of manufacturing a polarizing element according to claim 6, wherein the forming of inorganic micro-particle layers comprises:
 forming a first inorganic micro-particle layer having the first convex portion that is obliquely directed to the side of the first adjacent reflection layer by obliquely forming a film from the side of the first adjacent reflection layer; and
 forming a second inorganic micro-particle layer having the second convex portion obliquely directed to the side of the second adjacent reflection layer by obliquely forming a film from the side of the second adjacent reflection layer.

8. An electronic apparatus comprising a polarizing element that is manufactured by using the method according to claim 6.

9. The method of manufacturing a polarizing element according to claim 6, further comprising forming a protection layer directly on at least the first convex portion and the second convex portion that are separated by the at least one concave portion in the inorganic micro-particle layers; and
 forming a groove portion between adjacent absorption layers.

* * * * *